United States Patent
Wu et al.

(10) Patent No.: US 11,057,948 B2
(45) Date of Patent: Jul. 6, 2021

(54) METHOD AND APPARATUS FOR CONNECTING TO WIRELESS ACCESS POINT

(71) Applicant: SHANGHAI ZHANGMEN SCIENCE AND TECHNOLOGY CO., LTD., Shanghai (CN)

(72) Inventors: Peixi Wu, Shanghai (CN); Fei Wang, Shanghai (CN)

(73) Assignee: SHANGHAI ZHANGMEN SCIENCE AND TECHNOLOGY CO., LTD., Shanghai (CN)

(*) Notice: Subject to any disclaimer, the term of this patent is extended or adjusted under 35 U.S.C. 154(b) by 10 days.

(21) Appl. No.: 16/594,036

(22) Filed: Oct. 6, 2019

(65) Prior Publication Data
US 2020/0059978 A1 Feb. 20, 2020

Related U.S. Application Data

(63) Continuation of application No. PCT/CN2017/119832, filed on Dec. 29, 2017.

(30) Foreign Application Priority Data

Apr. 6, 2017 (CN) .......................... 201710221985.4

(51) Int. Cl.
| | |
|---|---|
| *H04W 76/11* | (2018.01) |
| *H04W 48/16* | (2009.01) |
| *H04W 92/10* | (2009.01) |

(52) U.S. Cl.
CPC ............ *H04W 76/11* (2018.02); *H04W 48/16* (2013.01); *H04W 92/10* (2013.01)

(58) Field of Classification Search
CPC ..... H04W 76/11; H04W 48/16; H04W 92/10; H04L 29/06; H04L 63/0876; H04L 9/3247
See application file for complete search history.

(56) References Cited

U.S. PATENT DOCUMENTS

| | | | |
|---|---|---|---|
| 2013/0022083 A1* | 1/2013 | Vasseur | H04L 12/4035 375/132 |
| 2016/0226870 A1* | 8/2016 | Chiu | H04L 63/0492 |
| 2020/0092926 A1* | 3/2020 | Li | H04W 76/14 |

* cited by examiner

*Primary Examiner* — Wei Zhao
(74) *Attorney, Agent, or Firm* — Bayramoglu Law Offices LLC

(57) ABSTRACT

A method for connecting to a wireless point by an application in the user equipment includes: acquiring identification information and access information of a target wireless access point from target image information corresponding to the triggering operation by a user in the application and; and establishing a wireless connection between the user equipment having the application and the target wireless access point according to the identification information and the access information. The present disclosure simplifies a process of connecting to a wireless access point, reduces an input error rate, and improves the operation efficiency of connecting to a wireless access point and user experience.

11 Claims, 1 Drawing Sheet

__NUM__US 11,057,948 B2__NUM__

METHOD AND APPARATUS FOR CONNECTING TO WIRELESS ACCESS POINT

CROSS REFERENCE TO THE RELATED APPLICATIONS

This application is the continuation application of International Application No. PCT/CN2017/119832, filed on Dec. 29, 2017, which is based upon and claims priority to Chinese Patent Application No. CN201710221985.4, filed on Apr. 6, 2017, the entire contents of which are incorporated herein by reference.

TECHNICAL FIELD

The present disclosure relates to the field of communications, in particular to a technology used for connecting to a wireless access point.

BACKGROUND

With the advancement of technology, wireless networks have been widely used throughout people's work life and personal life. When a user's mobile device needs to connect to a wireless network, the identification information and the access information of the wireless network are usually required, such as an access point name and an access password. Specifically, the identification information and the access information are usually entered by the user through the input unit of the mobile device, such as a physical keyboard or a virtual keyboard on the touch screen. Therefore, the connection process may be complicated and cumbersome, the connection time is long, and the information input is error-prone.

SUMMARY

One objective of the present disclosure is to provide a method for connecting to a wireless access point.

According to the first aspect of the present disclosure, a method for connecting to a wireless access point by an application in user equipment includes the following steps:

acquiring the identification information and the access information of a target wireless access point from the target image information corresponding to a triggering operation by a user in an application; and establishing a wireless connection between the user equipment having the application and the target wireless access point according to the identification information and the access information.

According to the second aspect of the present disclosure, a method for connecting to a wireless access point includes the following steps:

triggering a camera device of the user equipment to acquire the access information of the target wireless access point according to a connection operation of the user to connect to the target wireless access point; and establishing a wireless connection between the user equipment and the target wireless access point according to the access information.

According to the third aspect of the present disclosure, a method for connecting to a wireless access point includes the following steps:

triggering a camera device of the user equipment to acquire the identification information and the access information of a target wireless access point according to a connection operation of the user to connect to the wireless access point; and establishing a wireless connection between the user equipment and the target wireless access point according to the identification information and the access information.

According to the fourth aspect of the present disclosure, equipment for connecting to a wireless access point by means of an application in the user equipment includes:

a processor;

a memory configured to store executable instructions of a computer, wherein the executable instructions are executed by the processor, and the executable instructions include:

acquiring the identification information and the access information of a target wireless access point from the target image information corresponding to the triggering operation by a user in an application; and establishing a wireless connection between the user equipment having the application and the target wireless access point according to the identification information and the access information.

According to the fifth aspect of the present disclosure, equipment for connecting to a wireless access point includes:

a processor;

a memory configured to store executable instructions of a computer, wherein the executable instructions are executed by the processor, and the executable instructions include:

triggering a camera device of the user equipment to acquire the access information of the target wireless access point according to a connection operation of the user to connect to the target wireless access point; and establishing a wireless connection between the user equipment and the target wireless access point according to the access information.

According to the sixth aspect of the present disclosure, equipment for connecting to a wireless access point includes:

a processor;

a memory configured to store executable instructions of a computer, wherein the executable instructions are executed by the processor, and the executable instructions include:

triggering a camera device of the user equipment to acquire the identification information and the access information of a target wireless access point according to a connection operation of the user to connect to the wireless access point; and establishing a wireless connection between the user equipment and the target wireless access point according to the identification information and the access information.

According to the seventh aspect of the present disclosure, a computer-readable medium includes instructions; when the instructions are executed, a system performs the following operations:

acquiring the identification information and the access information of a target wireless access point from the target image information corresponding to the triggering operation by the user in an application; and establishing a wireless connection between the user equipment having the application and the target wireless access point according to the identification information and the access information.

According to the eighth aspect of the present disclosure, a computer-readable medium includes instructions; when the instructions are executed, a system performs the following operations:

triggering a camera device of the user equipment to acquire the access information of the target wireless access point according to a connection operation of the user to connect to the target wireless access point; and establishing a wireless connection between the user equipment and the target wireless access point according to the access information.

According to the ninth aspect of the present disclosure, a computer-readable medium includes instructions; when the instructions are executed, a system performs the following operations:

triggering a camera device of the user equipment to acquire the identification information and the access information of a target wireless access point according to a connection operation of the user to connect to the wireless access point;

establishing a wireless connection between the user equipment and the target wireless access point according to the identification information and the access information.

Compared with the prior art, a mobile terminal in the present disclosure captures or scans an image recording the identification information and/or the access information of a wireless access point. After analyzing and identifying the image, the mobile terminal can connect to the wireless access point through the identification information and the access information. The present application simplifies a process of connecting to a wireless access point, reduces the probability of input errors, and improves the operation efficiency of connecting to a wireless access point for a user, thus improving user experience.

BRIEF DESCRIPTION OF THE DRAWINGS

Based on the following detailed description of the drawings relative to the nonrestrictive embodiments, the features, purposes and advantages of the present disclosure will be illustrative.

The same or similar designators in the drawings represent the same or similar parts.

DETAILED DESCRIPTION OF THE EMBODIMENTS

Figure 1:
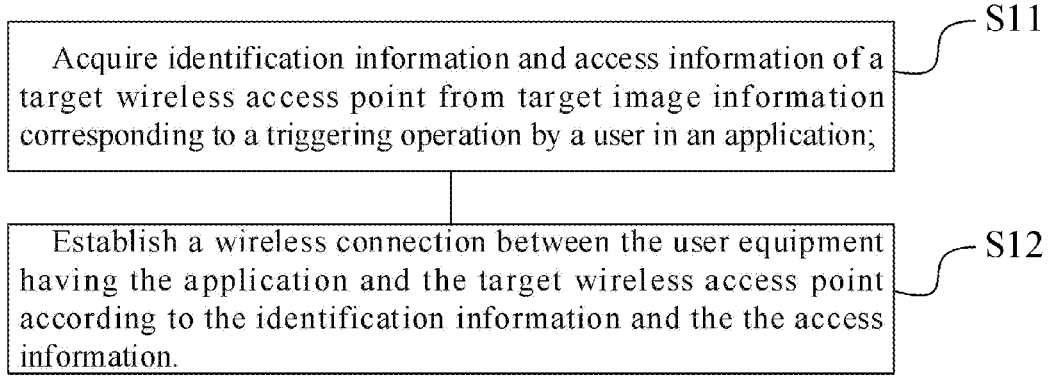
FIG. 1 is a flow diagram showing a method for connecting to a wireless access point by means of an application in the user equipment in the first embodiment according to the present disclosure.

The present disclosure will be further described below in conjunction with the drawings. In a typical configuration of the present disclosure, a terminal, equipment of service network and a trusted party all include one or more central processing units (CPU), input/output interfaces, network interfaces, and memories.

The memory may include the non-persistent memory, the random access memory (RAM), and/or the non-volatile memory (such as the read only memory (ROM) or flash memory) in computer-readable media. The memory is an example of the computer-readable media.

The computer-readable media may include the persistent computer-readable media, the non-persistent computer-readable media, the mobile computer-readable media and the non-mobile computer-readable media, which can store information by any method or technology. The information may include the computer-readable instructions, the data structures, the modules of programs, and/or others. Examples of the computer storage media include but are not limited to, the phase-change random access memory (PRAM), the static random access memory (SRAM), the dynamic random access memory (DRAM) or the other types of random access memory (RAM), read-only memory (ROM), the electrically erasable programmable read only memory (EEPROM), the flash memory or other memory technology, the compact disk read only memory (CD-ROM), the digital versatile disk (DVD) or the other optical storage device, the magnetic cassette tape, the magnetic disk storage device or the other magnetic storage device, or any other non-transmission media, which can be used to store information that can be accessed by computing devices. As defined herein, the computer-readable media does not include non-transitory computer-readable media, such as the modulated data signals and the carrier waves.

The said equipment in the present disclosure includes but is not limited to a user equipment, a network equipment, or an equipment formed by integrating the user equipment and the network equipment through a network. The user equipment includes but is not limited to any kind of mobile electronic product capable of performing the human-computer interaction (such as human-computer interaction through a touchpad) with the users, such as a smart phone, a tablet computer, and other devices. The mobile electronic product can run any operating system, such as an Android operating system, the iphone operating system (iOS), and others. Specifically, the network equipment includes an electronic equipment configured to automatically perform numerical calculation and information processing according to the preset/pre-stored instructions, and the hardware thereof includes but is not limited to a microprocessor, an application specific integrated circuit (ASIC), a programmable logic device (PLD), a field programmable gate array (FPGA), a digital signal processor (DSP), an embedded devices, and others. The network equipment includes but is not limited to a computer, a network host, a single network server, multiple network server clusters, or a cloud composed of multiple servers. Herein, the cloud is composed of a large number of computers or network servers based on cloud computing, wherein the cloud computing is a type of distributed computing, and performed by a virtual super-computer integrated by a group of loosely coupled computer clusters. The network includes but is not limited to a Internet, a wide area network, a metropolitan area network a local area network, a virtual private network (VPN), a wireless ad hoc network, and others. Preferably, the equipment may run a program on the user equipment, the network equipment, the equipment formed by integrating the user equipment, the network equipment and a touch terminal through a network, or the equipment formed by integrating the network equipment and a touch terminal through a network.

The said device in the present disclosure includes but is not limited to a user device, a network device, or a device formed by integrating the user device and the network device through a network. The user device includes but is not limited to any kind of mobile electronic product capable of performing the human-computer interaction (such as human-computer interaction through a touchpad) with the user, such as the smart phone, the tablet computer, and others. The mobile electronic product can run any operating system, such as the android operating system, iOS, and others. Specifically, the network device includes the electronic device configured to automatically perform numerical calculation and information processing according to the preset/pre-stored instructions, and the hardware thereof includes but is not limited to the microprocessor, ASIC, PLD), FPGA, DSP, an embedded device, and others. The network device includes but is not limited to the computer, the network host, the single network server, multiple network server clusters, or the cloud composed of multiple servers. Herein, the cloud is composed of a large number of computers or network servers based on cloud computing, wherein the cloud computing is a type of distributed computing, and performed by a virtual supercomputer integrated by a group of loosely coupled computer clusters. The network includes but is not limited to the Internet, the wide area network, the metropolitan area network, the local area network, the VPN network, the wireless ad hoc network, and others. Preferably, the device may run a program on the user device, the network device, the device formed by integrating the user device, the network device and the touch terminal through a network, or the device formed by integrating the network device and the touch terminal through a network.

Of course, those skilled in the art should understand that the aforementioned equipment or device is merely exemplary. Other existing or prospective equipment or device which may be applied to the present disclosure should also be included within the scope of the present application, and are hereby incorporated by reference.

In the description of this application, "multiple" means two or more, unless specifically defined.

The present disclosure can be implemented in a nonrestrictive manner based on a system application in the operating system of the user equipment, or based on application software installed on the user equipment. The technical features of the present disclosure can be arbitrarily combined and are not explicitly or implicitly limited by the specific embodiments except for causing confusion or contradiction.

Taking the wireless access point connection application installed on the user equipment as an example, the present disclosure is described in detail hereinafter.

FIG. 1 illustrates a method of connecting to a wireless access point through an application in the user equipment according to the first aspect of the present disclosure, and the method includes the steps S11 and S12.

In the step S11, the wireless access point connection application acquires the identification information and the access information of a target wireless access point from the target image information corresponding to the triggering operation by the user in the application. In the step S12, the wireless access point connection application establishes a wireless connection between the user equipment having the application and the target wireless access point according to the identification information and the access information.

Specifically, the step S11, in which the wireless access point connection application acquires the identification information and the access information of a target wireless access point from the target image information corresponding to the triggering operation by the user in an application, means that when the wireless access point connection application is running, the user equipment detects the user operation. When a triggering operation by the user attempting to connect to the target wireless access point is detected, according to the triggering operation, the identification information and/or the access information of the target wireless access point are identified and acquired from the target image information corresponding to the identification information and/or the access information of the target wireless access point. Specifically, the identification information and/or the access information from the target image information can be identified and acquired by the optical character recognition technology. The user performs the triggering operation on the user equipment. When a triggering operation is detected, the application or the user equipment performs a corresponding operation. In this embodiment, when the triggering operation by the user is detected, the identification information and the access information of the target wireless access point is acquired from the target image information. Generally, the detectable operation of the user can be used as a triggering operation. For example, the button of the user equipment is tapped, the touch is detected in a specific area of the user's touch screen; the preset sound sequence is detected by a microphone of the user equipment; the preset information is read by the Near Field Communication (NFC) component of the user equipment; or the preset motion state of the user equipment is detected by a gravity sensor, an acceleration sensor and a gyroscope sensor of the user equipment, and others.

Of course, those skilled in the art should understand that the aforementioned triggering operation is merely exemplary. Other existing or prospective triggering operation which may be applied to the present disclosure should also be included within the scope of the present application, and are hereby incorporated by reference.

Furthermore, the target image information used for extracting the identification information and/or the access information of the target wireless access point may be pre-stored in the user equipment, or may be acquired in real time, wherein the real-time acquisition method may include transmitting the target image information from the user equipment, the network equipment, and the like to the user equipment by the wired or wireless means, or calling the own or connected camera of the user equipment to capture or scan the target image information. For example, the user taps the "Get the access information" button provided by the access point connection application on the touch screen of the mobile terminal (such as a mobile phone), and then the application reads and identifies the acquired pre-stored images which record a Service Set Identifier (SSID) and a connection password of the target wireless access point (such as a WiFi hotspot). After obtaining the SSID and the connection password, the application connects the target wireless access point based on the SSID and the connection password. The images are stored after the content displayed on an electronic display screen, the printed or handwritten material posted on a wall, or the written contents temporarily provided by the wireless access point provider are captured by the camera on the mobile terminal. The images may also be shared by other users to the mobile terminal via the Bluetooth, the NFC, the cellular mobile network, and the like. As another example, the user taps the "Get the access information" button provided by the access point connection application on the touch screen of his mobile terminal (such as a mobile phone), and then the application calls the camera installed in the mobile terminal to capture the content displayed on an electronic display screen, the printed or handwritten material posted on a wall, or the written contents temporarily provided by the wireless access point provider, which show or record the SSID and the connection password of the target wireless access point to be connected. Then, the application identifies the characters from the captured images to acquire the SSID and the connection password of the target wireless access point, so that the mobile terminal can connect to the target wireless access point based on the SSID and the connection password.

In particular, when the SSID of the wireless access point has been input, for example, when the user selects the corresponding target wireless access point in the list of currently accessible wireless access points, the corresponding connection password is identified and acquired from the target image information, thereby connecting to the target wireless access point.

Furthermore, the user equipment or mobile terminal includes but is not limited to any kind of mobile electronic product that can perform the human-computer interaction (such as the human-computer interaction through a touchpad) with the user, such as a smart phone, a tablet computer, and other devices. The mobile electronic product can run any operating system, such as the android operating system, the iPhone Operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through extensible authentication protocol (EAP). When the target wireless access point to be connected is an EAP hotspot, the information needed by the connection is identified and acquired from the target image information.

Of course, those skilled in the art should understand that the aforementioned user equipment, mobile terminal or wireless access point is merely exemplary. Other existing or prospective user equipment, mobile terminal or wireless access point which may be applied to the present disclosure should also be included within the scope of the present application, and are hereby incorporated by reference.

Subsequently, the step S12, in which the wireless access point connection application establishes a wireless connection between the user equipment having the application and the target wireless access point according to the identification information and the access information, means that after the identification information and the access information of the target wireless access point have been acquired, based on the identification information (such as the SSID of the target wireless access point) and the access information (such as the connection password), the wireless access point connection application establishes a wireless connection between the user equipment (such as a mobile terminal used by the user) having the application and the target wireless access point. For example, a mobile phone of the user identifies and acquires a WiFi access point encrypted by WPA, which has the SSID of "tplink" and the connection password of "12345678", and then the wireless connection between the mobile phone and the WiFi access point is established according to the hotspot name "tplink" and the connection password "12345678". Specifically, the process of establishing the wireless connection may be completed by the wireless access point connection application, or may be completed by the operating system or the other application by calling an interface provided by the equipment operating system or other application.

Furthermore, the user equipment includes but is not limited to any kind of mobile electronic product that can perform human-computer interaction with the user (such as human-computer interaction through a touchpad), such as a smart phone, a tablet computer, and other devices. The mobile electronic product can run any operating system, such as the android operating system, iPhone operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through EAP. When the target wireless access point to be connected is an EAP hotspot, the information needed by the connection is identified and acquired from the target image information.

Of course, those skilled in the art should understand that the aforementioned user equipment or wireless access point is merely exemplary. Other existing or prospective user equipment or wireless access point which may be applied to the present disclosure should also be included within the scope of the present application, and are hereby incorporated by reference.

Preferably, the step S11 includes the sub-step S11a and the sub-step S11b.

In the sub-step S11a, the wireless access point connection application acquires the target image information corresponding to the triggering operation triggering of the user in the application. In the sub-step S11b, the wireless access point connection application extracts the identification information and the access information of the target wireless access point from the target image information.

Specifically, the sub-step S11a, in which the wireless access point connection application acquires the target image information corresponding to the triggering operation according to the triggering operation by the user in the application, means that the wireless access point connection application detects a triggering operation by the user in the application. When the triggering operation by the user is detected, the target image information corresponding to the triggering operation is acquired according to the triggering operation. Specifically, the wireless access point connection application is installed in the user equipment of the user. The target image information includes the corresponding identification information and/or the access information of the target wireless access point. The identification information and/or the access information of the target wireless access point are acquired by performing the character recognition from the target image information.

Subsequently, in the sub-step S11b, the wireless access point connection application extracts the identification information and the access information of the target wireless access point from the target image information.

For example, the user taps the "Get the access information" button provided by the access point connection application on the touch screen of his mobile terminal (such as a mobile phone), and then the application reads and identifies the acquired pre-stored images which record the SSID and the connection password of the target wireless access point (such as a WiFi hotspot). After obtaining the SSID and the connection password, the application connects the target wireless access point based on the SSID and the connection password. The images are stored after the content displayed on an electronic display screen, the printed or handwritten material posted on a wall, or the written contents temporarily provided by the wireless access point provider are captured by the camera on the mobile terminal. The images may also be shared by other users to the mobile terminal via the Bluetooth, the NFC, the cellular mobile network, and the like. As another example, the user taps the "Get the access information" button provided by the access point connection application on the touch screen of his mobile terminal (such as a mobile phone), and then the application calls the camera installed in the mobile terminal to capture the content displayed on an electronic display screen, the printed or handwritten material posted on a wall, or the written contents temporarily provided by the wireless access point provider, which show or record the SSID and the connection password of the target wireless access point to be connected. Then, the application identifies the characters from the captured images to acquire the SSID and the connection password of the target wireless access point, so that the mobile terminal can connect to the target wireless access point based on the SSID and the connection password.

Furthermore, the user equipment or mobile terminal includes but is not limited to any kind of mobile electronic product that can perform the human-computer interaction (such as the human-computer interaction through a touchpad) with the user, such as a smart phone, a tablet computer, and other devices. The mobile electronic product can run any operating system, such as the android operating system, iPhone operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through EAP. When the target wireless access point to be connected is an EAP hotspot, the information needed by the connection is identified and acquired from the target image information. The user performs the triggering operation on the user equipment. When a triggering operation is detected, the application or the user equipment performs a corresponding operation. In this embodiment, when the user's triggering operation is detected, the identification information and the access information of the target wireless access point is acquired from the target image information. Generally, the detectable operation of the user can be used as a triggering operation. For example, the button of the user equipment is tapped; the touch in a specific area of the user's touch screen is detected; the preset sound sequence is detected by a microphone of the user equipment; the preset information is read by the NFC component of the user equipment; or the preset motion state of the user equipment is detected by a gravity sensor, an acceleration sensor and a gyroscope sensor of the user equipment, and others.

Of course, those skilled in the art should understand that the aforementioned user equipment, mobile terminal, wireless access point or triggering operation is merely exemplary. Other existing or prospective user equipment, mobile terminal, wireless access point or triggering operation which may be applied to the present disclosure should also be included within the scope of the present application, and are hereby incorporated by reference.

Preferably, the image information used for extracting the identification information and/or the access information of the target wireless access point includes image information captured in real time by the camera device of the user equipment operated by the user. For example, the images may be captured by the camera on the mobile terminal, wherein the images record the wireless access point name (such as the SSID) and the access information (such as the connection password), and are displayed on the electronic display screen or posted, written, or printed on the wall. The images may also be shared by other users. For example, other users share the images to the user equipment via the Bluetooth, the NFC, the cellular mobile network, and the like.

Furthermore, before extracting the identification information and the access information of the target wireless access point from the image information, the image information may be preprocessed for improving the recognition accuracy and the recognition efficiency. For example, the processing of graying, binarization, image filtering, or image enhancement is performed on the image acquired in the sub-step S11a, and then the character recognition is performed in the sub-step S11b to extract the identification information and the access information of the target wireless access point. As another example, in the sub-step S11a, multiple static images or a dynamic image/video are acquired. As for multiple static images, the image having the highest definition is singled out from the multiple static images by evaluating the multiple static images according to the image histogram method, the energy variance method, the Gaussian variance method, the square Gaussian gradient method or other evaluation functions. As for a dynamic image/video, each frame of the dynamic image/video is evaluated by a similar evaluation function, and the frame with the highest definition is singled out, and used to extract the identification information and the access information of the target wireless access point.

Preferably, in the sub-step S11b, the wireless access point connection application performs the following operations: identifying one or more character strings (hereinafter referred to as "string") from the target image information; and when the strings include a keyword of the identification information of the wireless access point, extracting the identification information of the target wireless access point from the strings; when the strings include a keyword of the password information of the wireless access point, extracting the access information of the target wireless access point from the strings.

For example, after performing the character recognition on the target image information, two strings, the string 1 (str1) "SSID: tplink" and the string 2 (str2) "Password: 12345678", are obtained. Then, the keyword "SSID" is detected in string 1, so as to extract "tplink" as the identification information of the target wireless access point; and the keyword "Password" is detected in string 2, so as to extract "12345678" as the access information of the target wireless access point, wherein the keywords (such as "SSID" and "Password") and the corresponding information (such as the identification information and the access information) in string 1 and string 2 may be separated by the spaces or special characters (such as ":"), or unseparated. In addition, the keyword is various. For example, the keyword corresponding to the identification information may be "SSID", "hotspot", "WiFi", and others, and the keyword corresponding to the access information may be "Password", "hot password", "WiFi password", "PWD", and others. In some cases, in order to further improve the recognition accuracy, the string 2 contains characters other than letters, Arabic numerals and symbols. For example, the access information in the form of "one two three four five six seven eight", is converted to "12345678" for connecting the user equipment and the target wireless access point.

Preferably, in the sub-step S11b, the wireless access point connection application performs the following operations: identifying multiple strings from the target image information, wherein there is at least one space character between any two strings; when the first string in the multiple strings is matched with a wireless access point scanned by the user equipment, using the first string as the identification information of the target wireless access point; and determining one or more pieces of access information of the target wireless access point, wherein each piece of access information corresponds to one of the multiple strings other than the first string. Then, in the step S12, according to the identification information and at least one of the one or more pieces of access information, the wireless access point connection application attempts to establish a wireless connection between the user equipment having the application and the target wireless access point until the connection succeeds or traverses the multiple access information.

For example, multiple strings are acquired by the character recognition from the image recording the identification information and the access information of the target wireless access point captured by the camera of the user equipment. The multiple strings are separated from each other by the space character, wherein the space character may be a space or a line break character. For example, the SSID and the connection password of the target wireless access point are written on the same line but spaced, or the SSID and the connection password are respectively written in two different lines. Supposing that when the multiple strings "tplink", "12345678" and "welcome" are captured by the user in the shop, and then are recognized, the multiple strings are judged. When one of the multiple strings (for example, "tplink", marked as the first string) matches the one ("tplink") of the current wireless access points list (for example, including "tplink", "alpha", and "beta") scanned by the user equipment, the first string ("tplink") is taken as the identification information of the target wireless access point, and one or more other strings (such as "12345678" and "welcome") other than the first string of the multiple strings are used as candidates for the access information corresponding to the foregoing the identification information. Each time one string is singled out from the one or more other strings as the access information, and is combined with the aforementioned the identification information to try to connect the user equipment to the target wireless access point. Specifically, according to the determined identification information, one of the other strings singled out each time is taken as the access information, and tries to connect the corresponding wireless access point and the user equipment having the wireless access point connection application until the connection succeeds. When any of the multiple strings other than the first string, which is used as the access information, fails to connect the user equipment to the wireless access point corresponding to the identification information, that is, other strings are traversed but unsuccessful, the attempt process terminates and the connection fails.

Preferably, the first string as the identification information and the multiple recognized strings are located on the same line, and they are distinguished by the space character between them. For example, there are only two strings in the same line, and the two strings are the identification information and the access information and are adjacent in the left-right direction. Or the first character and the multiple strings are located in two rows, for example, only two strings "tplink" and "12345678" adjacent to each other in the upper and lower lines are recognized. One of the two strings is used as the identification information, and the other is used as the access information.

Preferably, in the step S11, the wireless access point connection application drives the camera device of the user equipment to continuously perform a scanning operation according to the triggering operation by the user in the application until the identification information and the access information of the target wireless access point are obtained from the scanned target image information. For example, the camera on the mobile terminal continuously shoots to obtain multiple static images or a dynamic image/video, such as the scanning operation. Each of the continuously acquired multiple static images is evaluated by the image histogram method, the energy variance method, the Gaussian variance method, the square Gaussian gradient method and other evaluation functions. When the definition of at least one of the multiple static images is high enough (for example, the function value of the definition reaches preset threshold), the identification information and the access information can be acquired from the image, and the continuous shooting finishes. Each frame of the continuously acquired dynamic image/video is evaluated by a similar evaluation function. When the definition of at least one of the frames is high enough, the identification information and the access information of the target wireless access point can be extracted from the dynamic image/video, and the continuous shooting finishes.

Specifically, the user equipment or mobile terminal includes but is not limited to any kind of mobile electronic product that can perform the human-computer interaction with the user (such as the human-computer interaction through a touchpad), such as a smart phone, a tablet computer, and other devices. The mobile electronic product can run any operating system, such as the android operating system, iPhone operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through EAP. When the target wireless access point to be connected is an EAP hotspot, the information needed by the connection is identified and acquired from the target image information. The user performs the triggering operation on the user equipment. When a triggering operation is detected, the application or the user equipment performs a corresponding operation. In this example, when the user's triggering operation is detected, the identification information and the access information of the target wireless access point is acquired from the target image information. Generally, the detectable operation of the user can be used as a triggering operation, for example, the button of the user equipment is tapped; a touch in a specific area of the user's touch screen is detected; a preset sound sequence is detected by a microphone of the user equipment; the preset information is read by the NFC component of the user equipment; or a preset movement state of the user equipment is detected by a gravity sensor, an acceleration sensor and a gyroscope sensor of the user equipment, and others.

Of course, those skilled in the art should understand that the aforementioned user equipment, mobile terminal, wireless access point or triggering operation is merely exemplary. Other existing or prospective user equipment, mobile terminal, wireless access point or triggering operation which may be applied to the present disclosure should also be included within the scope of the present application, and are hereby incorporated by reference.

Preferably, the method further includes the step S13. In the step S13, according to the identification information, the wireless access point connection application detects whether the wireless access point list scanned by the user equipment includes the target wireless access point. For example, after the identification information and the access information of the target wireless access point to be connected are recognized according to the captured or scanned image, the wireless access point connection application detects whether the wireless access point list scanned by the user equipment includes the a connectable wireless access point consistent with the identification information, wherein the wireless access point list shows the wireless access points that the user equipment currently can connect to. Thereafter, in the step S12, if the wireless access point list includes the target wireless access point, the wireless access point connection application establishes a wireless connection between the user equipment having the application and the target wireless access point based on the identification information and the access information. For example, based on the identification information (such as the SSID of the target wireless access point) and the access information (such as the connection password), the wireless access point connection application establishes a wireless connection between the user equipment (such as a mobile terminal of the user) having the application and the target wireless access point. For example, a mobile phone of the user identifies and acquires a WiFi access point encrypted by WPA, wherein the SSID thereof is tplink and the connection password thereof is 12345678, and then the wireless connection is established between the mobile phone and the WiFi access point according to the hotspot name "tplink" and the connection password "12345678". Specifically, the process of establishing the wireless connection may be completed by the wireless access point connection application, or may be completed by an operating system or other application by calling an interface provided by the equipment operating system or other application.

Furthermore, the user equipment includes but is not limited to any kind of mobile electronic product that can perform human-computer interaction with the user (such as human-computer interaction through a touchpad), such as a smart phone, a tablet computer, and other devices. The mobile electronic product can run any operating system, such as the android operating system, iPhone operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through extensible authentication protocol (EAP). When the target wireless access point to be connected is an EAP hotspot, the information needed by the connection is identified and acquired from the target image information.

Of course, those skilled in the art should understand that the aforementioned user equipment or wireless access point is merely exemplary. Other existing or prospective user equipment or wireless access point which may be applied to the present disclosure should also be included within the scope of the present application, and are hereby incorporated by reference.

Preferably, the method further includes the step S14. In step 14, when the triggering operation is obtained, the user equipment is triggered to scan a list of wireless access points at the current location. For example, the wireless access point connection application detects whether the user has performed a specific triggering operation on the user equipment. If the specific triggering operation is detected and acquired, the user equipment scans the nearby wireless hotspot according to the specific triggering operation to acquire a list of wireless access points at its current location. For example, under the IEEE 802.1x protocol, the scanning is performed by detecting a beacon frame sent by an access point. After acquiring the list of wireless access points at the location of the user equipment, in the step S13, the wireless access point connection application detects whether the list of wireless access points includes the target wireless access point according to the identification information.

For example, the user taps the "Get the access information" button provided by the access point connection application on the touch screen of the mobile terminal (such as a mobile phone). After detecting the touch operation, the mobile terminal performs the following two steps based on the touch operation. Firstly, the mobile terminal gets a list of wireless access points at its location based on the touch operation. The list can be acquired by scanning the nearby wireless access points in real time or by querying the port provided by the mobile terminal. Secondly, the mobile terminal acquires the identification information and/or the access information from the target image corresponding to the identification information and/or the access information of the target wireless access point to be connected.

In general, there is no decided sequence requirement between the aforementioned first step and second step, that is, the present disclosure does not specify a decided sequence between the step S14 and the step S11. The user equipment or mobile terminal includes but is not limited to any kind of mobile electronic product that can perform the human-computer interaction (such as the human-computer interaction through a touchpad) with the user, such as a smart phone, a tablet computer, and other devices. The mobile electronic product can run any operating system, such as the android operating system, iPhone operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through EAP. When the target wireless access point to be connected is an EAP hotspot, the information needed by the connection is identified and acquired from the target image information. In addition, the user performs the triggering operation on the user equipment. When a triggering operation is detected, the application or the user equipment performs a corresponding operation. In this example, when the user's triggering operation is detected, the identification information and the access information of the target wireless access point is acquired from the target image information. Generally, the detectable operation of the user can be used as a triggering operation. For example, the button of the user equipment is tapped; a touch is detected in a specific area of the user's touch screen; a preset sound sequence is detected by a microphone of the user equipment; the preset information is read by the NFC component of the user equipment; and a preset movement state of the user equipment is detected by a gravity sensor, an acceleration sensor and a gyroscope sensor of the user equipment, and others.

Of course, those skilled in the art should understand that the aforementioned user equipment, mobile terminal, wireless access point or triggering operation is merely exemplary. Other existing or prospective user equipment, mobile terminal, wireless access point or triggering operation which may be applied to the present disclosure should also be included within the scope of the present application, and are hereby incorporated by reference.

Preferably, the method further includes the step S15. In the step S15, when the wireless connection is successfully established, the wireless access point connection application shares the target wireless access point and the access information to the corresponding network equipment, wherein, the target wireless access point is identified in the network equipment by the identification information and the address information of the target wireless access point. For example, after acquiring the identification information and the access information of the target wireless access point, the user equipment tries to connect to the target wireless access point through the identification information and the access information. If the connection is successful, the user equipment shares the target wireless access point and the corresponding access information, allowing the user equipment to get back and use again or other user equipment to acquire and connect to the target wireless access point. Specifically, when the target wireless access point is shared, the identification information and the address information of the target wireless access point are distinguished from other access points. The address information may be the actual physical address information of the target wireless access point (such as longitude and latitude information or height information which may be obtained by a GPS sensor, a triangulation, and others.), or may be a media access control (MAC) address of the target wireless access point.

For example, the user tries to connect the own mobile terminal to the corresponding wireless access point based on the access point name (such as SSID) and the connection password, and the connection is successful. At this point, the access point name, and the connection password match with the wireless access point, and then can be shared for later use. The user equipment uploads the longitude and latitude information (obtained by a GPS sensor), the MAC address, the access point name and the connection password of the connected wireless access point to the cloud server. Other user equipment can match the access point name and the connection password of the wireless access point through the longitude and latitude information and the MAC address, and establish the corresponding wireless connection according to the access point name and the connection password.

Specifically, the user equipment or mobile terminal includes but is not limited to any kind of mobile electronic product that can perform the human-computer interaction (such as the human-computer interaction through a touchpad) with the user, such as a smart phone, a tablet computer, and other devices. The mobile electronic product can run any operating system, such as the android operating system, iPhone operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through EAP. When the target wireless access point to be connected is an EAP hotspot, the information needed by the connection is identified and acquired from the target image information. The network equipment includes an electronic equipment configured to automatically perform numerical calculation and information processing according to the preset/pre-stored instructions, and the hardware thereof includes but is not limited to a microprocessor, ASIC, PLD, FPGA, DSP, an embedded device, and others. The network equipment includes but is not limited to a computer, a network host, a single network server, multiple network server clusters, or a cloud composed of multiple servers. Herein, the cloud is composed of a large number of computers or network servers based on cloud computing, wherein the cloud computing is a type of distributed computing, and performed by a virtual supercomputer made up of a group of loosely coupled computer clusters.

Of course, those skilled in the art should understand that the aforementioned user equipment, mobile terminal, network equipment, wireless access point or address information are merely exemplary. Other existing or prospective user equipment, mobile terminal, network equipment, wireless access point or address information which may be applied to the present disclosure should also be included within the scope of the present application, and are hereby incorporated by reference.

Figure 2:
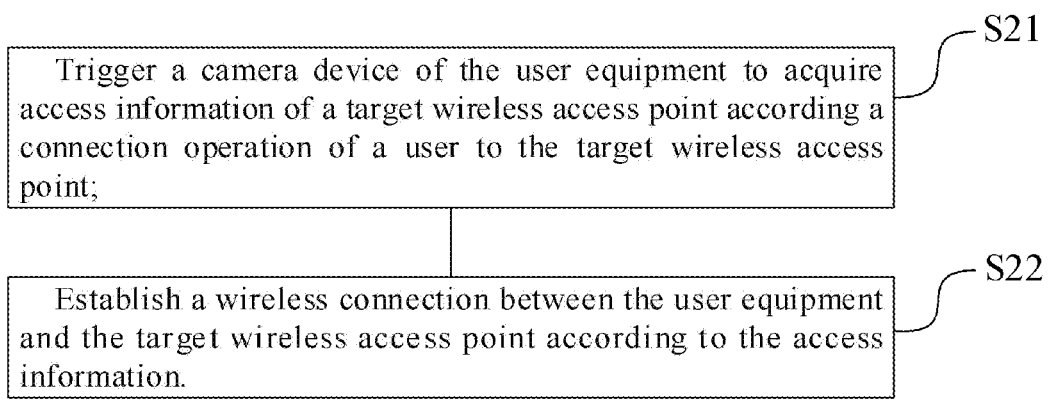
FIG. 2 is a flow diagram showing a method for connecting to a wireless access point in the second embodiment according to the present disclosure.

Referring to FIG. 2, according to the second aspect of the present disclosure, a method for connecting to a wireless access point includes the step S21 and the step S22.

In the step S21, according to the connection operation of the user to connect to the target wireless access point, the wireless access point connection application drives the camera device of the user equipment to acquire the access information of the target wireless access point. In the step S22, the wireless access point connection application establishes a wireless connection between the user equipment and the target wireless access point according to the access information. For example, in order to connect the user equipment to a certain wireless access point, the user selects the certain wireless access point as the target wireless access point, and performs a connection operation. After detecting the connection operation of the user, the wireless access point connection application drives the camera device of the user equipment to capture the content displayed on an electronic display screen, the printed or handwritten material posted on a wall, or the written contents temporarily provided by the wireless access point provider, and then identifies and acquires the corresponding access information from the captured images. After the user selects the certain wireless access point as the target wireless access point, the identification information of the target wireless access point is determined accordingly. According to the identification information and the aforementioned access information, a wireless connection between the user equipment and the target wireless access point is established. Specifically, the identification information from the target image information can be identified and acquired by the optical character recognition technology. Herein, those skilled in the art should understand that the method for acquiring the access information of the target wireless access point in FIG. 2 is the same as or substantially the same as the embodiment in FIG. 1, and therefore will not be described again and are hereby incorporated by reference.

For example, the mobile terminal of the user gets a list of wireless access points at its location by scanning. The list can be acquired by scanning the nearby wireless access points in real time or by querying the port provided by the mobile terminal. The user selects one of the one or more candidates access points in the list as the target wireless access point to be connected, by tapping on the touch screen of the mobile terminal. Subsequently, the user focuses the camera of the mobile terminal at the image area posted on the wall recording the connection password corresponding to the target wireless access point, and taps the "Get the access information" button on the mobile terminal, so as to call the camera to capture the image recording the connection password. The user equipment extracts the connection password from the captured image by the character recognition, and connects the mobile terminal and target wireless access point according to the connection password.

Preferably, in the step S21, the wireless access point connection application presents an access information input window of the target wireless access point according to the connection operation of the user to connect to the target wireless access point, wherein the access information input window includes an image capturing button. According to the triggering operation by the user on the image capturing button, the camera device of the user equipment is driven to acquire the access information of the target wireless access point. For example, after detecting a connection operation of the user to connect to the target wireless connection point, the access information input window of the target wireless access point is presented on the display device of the user equipment, and the window also includes an image capturing button corresponding to the image capturing instruction. Then, according to the triggering operation by the user on the image capturing button (such as, clicking on the touch screen, or triggering through other input devices such as mouse, keyboard, and others.), the user equipment calls the built-in or external camera device to capture the image that records the access information on other objects, and identifies the captured image (for example, through character recognition). After acquiring the access information, the connection between the user equipment and the target wireless access point can be established.

For example, the user selects the target wireless access point from a list of access points scanned by the user's mobile terminal, wherein the mobile terminal has a touch screen. Thereby, the identification information (for example, SSID) of the target wireless access point is acquired. At this time, the touch screen presents an access information input window with a text description (such as "connection password"), and provide an image capturing button. The image capturing button is a virtual button, and is usually arranged at the lower part or the right part of the access information input window. When the image capturing button is tapped, the built-in camera of the mobile terminal is driven to capture the image that records the access information on the objects such as the wall surface or the electronic display screen. According to the aforementioned identification information and the acquired access information, the connection between the mobile terminal and the target wireless access point can be established.

Specifically, the user equipment or mobile terminal includes but is not limited to any kind of mobile electronic product that can perform the human-computer interaction (such as the human-computer interaction through a touch-pad) with the user, such as a smart phone, a tablet computer, and other devices. The mobile electronic product can run any operating system, such as the android operating system, iPhone operating system (iOS), and others. The wireless access point includes but is not limited to an unencrypted wireless access point, or a wireless access point encrypted by WEP/WPA/WPA2 and other encryption technologies, and may be a wireless access point that is authenticated and connected through the SSID and the password information, or a wireless access point that is authenticated and connected through EAP. When the target wireless access point to be connected is an EAP hotspot, the information needed by the connection is identified and acquired from the target image information. In addition, the triggering operation is provided by the user's operation on the user equipment. When a triggering operation is detected, the application or the user equipment performs a corresponding operation. In this example, when the user's triggering operation is detected, the identification information and the access information of the target wireless access point is acquired from the target image information. Generally, the detectable operation of the user can be used as a triggering operation, for example, the button of the user equipment is tapped; a touch is detected in a specific area of the user's touch screen; a preset sound sequence is detected by a microphone of the user equipment; the preset information is read by the NFC component of the user equipment; a preset movement state of the user equipment is detected by a gravity sensor, an acceleration sensor and a gyroscope sensor of the user equipment and others.

Of course, those skilled in the art should understand that the aforementioned user equipment, mobile terminal, wireless access point or triggering operation is merely exemplary. Other existing or prospective user equipment, mobile terminal, wireless access point or triggering operation which may be applied to the present disclosure should also be included within the scope of the present application, and are hereby incorporated by reference.

Figure 3:
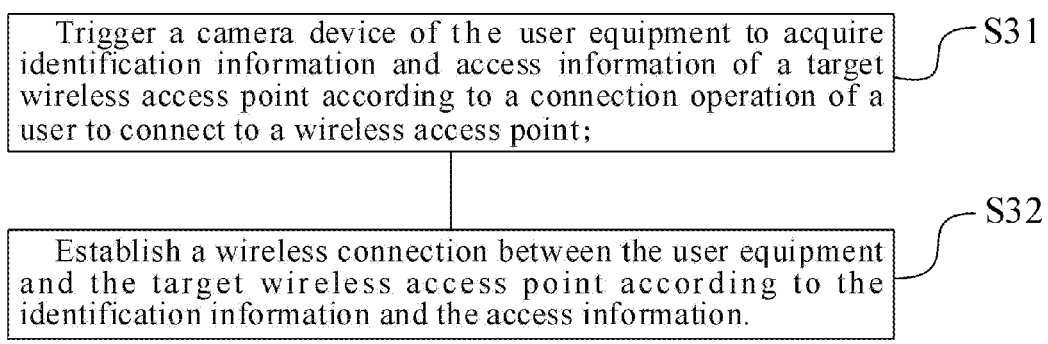
FIG. 3 is a flow diagram showing a method for connecting to a wireless access point in the third embodiment according to the present disclosure.

Referring to FIG. 3, according to the third aspect of the present disclosure, a method for connecting to a wireless access point includes the step S31 and the step S32.

In S31, according to the connection operation of the user to connect to the wireless access point, the wireless access point connection application drives the camera device of the user equipment to acquire the identification information and the access information of the target wireless access point. In the step S32, the wireless access point connection application establishes a wireless connection between the user equipment and the target wireless access point according to the identification information and the access information. For example, in order to connect the user equipment to a wireless network, when that connection operation is detected, the user equipment calls the built-in or external camera device to capture the target image that records the identification information and the access information of the target wireless access point on other objects, and identifies and acquires the identification information and the access information from the captured image, wherein the identification information and the access information correspond to the target wireless connection point to be connected. Subsequently, the wireless connection between the user equipment and the target wireless access point is established according to the identified identification information and the access information. Herein, those skilled in the art should understand that the method for acquiring the access information of the target wireless access point in FIG. 3 is the same as or substantially the same as the embodiment in FIG. 1, and therefore will not be described again and are hereby incorporated by reference.

For example, in order to connect the mobile terminal to the wireless network, the user taps the "Access Wireless Network" virtual button on the touch screen of the mobile terminal to acquire the user's wireless access point connection instruction, wherein the virtual button is provided by the wireless access point connection application. According to the user's wireless access point connection instruction, the built-in camera of the mobile terminal is called to capture the target image that records the access point name and the connection password on the wall, wherein the access point name and the connection password correspond to the target wireless access point. Based on the access point name and the connection password, the wireless connections between other equipment and the target wireless access point can be established. The target image is identified by the character recognition technology, to acquire the access point name and the connection password in the target image, and then the mobile terminal is connected to the target wireless access point according to the access point name and the connection password.

Preferably, in the step S31, the wireless access point connection application presents an information input window of the target wireless access point to be connected according to the connection operation of the user to connect to the wireless access point, wherein the information input window includes an image capturing button. According to the triggering operation by the user on the image capturing button, the camera device of the user equipment is driven to acquire the identification information and the access information of the target wireless access point. For example, in order to connect the user equipment to the wireless network, when that connection operation is detected, the display device of the user equipment presents the identification information input window and the access information of the target wireless access point, and also provides an image capturing button. According to the triggering operation by the user on the image capturing button (such as tapping or touching), the user equipment calls the built-in or external camera device to capture the image that records the identification information and the access information on other objects, and acquires the target image recording the identification information and the access information, and identifies the identification information and the access information from the captured image, wherein the identification information and the access information correspond, and both to correspond the target wireless connection point to which the user equipment can connect according to the identification information and the access information. Subsequently, the wireless connection between the user equipment and the target wireless access point is established according to the identified identification information and the access information.

For example, in order to connect the mobile terminal to the wireless network, the user taps the "Access Wireless Network" virtual button on the touch screen of the mobile terminal to acquire the user's wireless access point connection instruction, wherein the virtual button is provided by the wireless access point connection application. According to the user's wireless access point connection instruction, the display device of the user equipment further presents an information input window to input the access point name and password for connecting to the wireless access point, and provides an image capturing button at the same time. The user focuses the built-in camera of the mobile terminal at the image area posted on the wall recording the access point name and the connection password, and taps the image capturing button to capture the image recording the access point name and the connection password. A set of the access point name and the connection password is acquired in the manner of character recognition. Consequently, the mobile terminal can be connected to the corresponding target wireless access point according to the set of the access point name and the connection password.

Furthermore, the user equipment or mobile terminal includes but is not limited to any kind of mobile electronic product that can perform the human-computer interaction (such as the human-computer interaction through a touchpad) with the user, such as a smart phone, a tablet computer, and other devices. The mobile electronic product can run any operating system, such as the android operating system, iPhone operating system (iOS), and others. The wireless access point includes but is not limited to an unencrypted wireless access point, a wireless access point encrypted by WEP/WPA/WPA2 and other encryption technologies, a wireless access point that is authenticated and connected through the SSID and the password information, and a wireless access point that is authenticated and connected through EAP. When the target wireless access point to be connected is an EAP hotspot, the information needed by the connection is identified and acquired from the target image information. In addition, the user performs the triggering operation on the user equipment. When a triggering operation is detected, the application or the user equipment performs a corresponding operation. In this example, when the user's triggering operation is detected, the identification information and the access information of the target wireless access point is acquired from the target image information. Generally, the detectable operation of the user can be used as a triggering operation, for example, the button of the user equipment is tapped; a touch is detected in a specific area of the user's touch screen; a preset sound sequence is detected by a microphone of the user equipment; the preset information is read by the NFC component of the user equipment; and a preset movement state of the user equipment is detected by a gravity sensor, an acceleration sensor and a gyroscope sensor of the user equipment and others.

Of course, those skilled in the art should understand that the aforementioned user equipment, mobile terminal, wireless access point or triggering operation is merely exemplary. Other existing or prospective user equipment, mobile terminal, wireless access point or triggering operation which may be applied to the present disclosure should also be included within the scope of the present application, and are hereby incorporated by reference.

According to the fourth aspect of the present disclosure, the equipment for connecting to a wireless access point by an application in the user equipment includes:

a processor;

a memory configured to store executable instructions of a computer, wherein the executable instructions are executed by the processor; and the instructions include:

acquiring the identification information and the access information of a target wireless access point from the target image information corresponding to the triggering operation by a user in an application; for example, according to a touch operation of the user in the application window on a touch screen of a mobile terminal, the corresponding image stored in the mobile terminal is read, or a camera of the mobile terminal is called to capture a paper that records the name and the password of the target wireless access point to be connected in real time; and the name and the password of the target wireless access point is extracted from the captured image; and establishing a wireless connection between the user equipment having the application and the target wireless access point according to the identification information and the access information; for example, according to the aforementioned extracted name and password of the wireless access point, a connection between the mobile terminal and the target wireless access point can be established.

According to the fifth aspect of the present disclosure, the equipment for connecting to a wireless access point includes:

a processor;

a memory configured to store executable instructions of a computer, wherein the executable instructions are executed by the processor; and the instructions include:

triggering a camera device of the user equipment to acquire the access information of the target wireless access point according to a connection operation of the user to connect to the target wireless access point; for example, the user performs a touch operation in the application window on a touch screen of a mobile terminal to select the target wireless access point to be connected; then, a camera of the mobile terminal is called to capture a paper that records the connection password of the target wireless access point in real time; and the connection password of the target wireless access point is extracted from the captured image; and establishing a wireless connection between the user equipment and the target wireless access point according to the access information; for example, according to the aforementioned extracted password, a connection between the mobile terminal and the target wireless access point can be established.

According to the sixth aspect of the present disclosure, the equipment for connecting to a wireless access point includes:

a processor;

a memory configured to store executable instructions of a computer, wherein the executable instructions are executed by the processor; and the instructions include:

triggering a camera device of the user equipment to acquire the identification information and the access information of a target wireless access point according to a connection operation of the user to connect to the wireless access point; for example, the user performs a touch operation in the application window on a touch screen of a mobile terminal, a camera of the mobile terminal is called to capture a paper that records the name and the password of the target wireless access point to be connected in real time; and the name and the password of the target wireless access point is extracted from the captured image; and establishing a wireless connection between the user equipment and the target wireless access point according to the identification information and the access information; for example, according to the aforementioned extracted name and password of the wireless access point, a connection between the mobile terminal and the target wireless access point can be established.

According to the seventh aspect of the present disclosure, a computer-readable medium includes instructions; when instructions are executed, a system performs the following operations:

acquiring the identification information and the access information of a target wireless access point from the target image information corresponding to the triggering operation by the user in an application; and establishing a wireless connection between the user equipment having the application and the target wireless access point according to the identification information and the access information.

According to the eighth aspect of the present disclosure, a computer-readable medium includes instructions; when instructions are executed, a system performs the following operations:

triggering a camera device of the user equipment to acquire the access information of the target wireless access point according to a connection operation of the user to connect to the target wireless access point;

establishing a wireless connection between the user equipment and the target wireless access point according to the access information.

According to the ninth aspect of the present disclosure, a computer-readable medium includes instructions; when instructions are executed, a system performs the following operations:

triggering a camera device of the user equipment to acquire the identification information and the access information of a target wireless access point according to a connection operation of the user to connect to the wireless access point;

establishing a wireless connection between the user equipment and the target wireless access point according to the identification information and the access information.

It should be noted that the present disclosure can be implemented in software and/or a combination of software and hardware, such as an application specific integrated circuit (ASIC), a general-purpose computer, or any other similar hardware equipment. In one embodiment, the software program of the present disclosure can be executed by a processor to implement the steps or functions described above. Likewise, the software programs (including related data structures) of the present application can be stored in a computer-readable recording medium such as a RAM, a magnetic drive, an optical drive or a floppy disk and the like. In addition, some of the steps or functions of the present disclosure may be implemented by hardware, such as a circuit that cooperates with the processor to perform the steps or functions.

In addition, part of the present disclosure may be applied to computer program products, such as computer program instructions. When the computer program instructions are executed by the computer, the methods and/or technical solutions in accordance with the present disclosure can be invoked or provided by operation of the computer. Those skilled in the art should understand that the forms of computer program instructions embodied on the computer-readable medium include but are not limited to source files, executable files, installation package files, and the like. Correspondingly, the manners in which the computer program instructions are executed by the computer include but are not limited to the following manners. The computer directly executes the instructions. The computer compiles the instructions and then executes the corresponding compiled program. The computer reads and executes the instructions. After reading and installing the instructions, the computer executes the corresponding post-installation program. Herein, the computer-readable media can be any available computer-readable storage media or communication media that are accessed by the computer.

The communication media include media in which the communication signals can be transferred from one system to another, and the communication signals include computer-readable instructions, data structures, program modules or other data. The communication media may include transmission media with conductors (such as coaxial cables, twisted pairs, optical fibers, and others.) and wireless media (without conductor) capable of transmitting energy waves, such as sound, electromagnetic, radio frequency (RF), microwave, and infrared. The computer-readable instructions, data structures, program modules or other data may be embodied, for example, as modulated data signals in the wireless media, such as a carrier wave or a similar manner embodied as part of spread-spectrum technologies. The term "modulated data signal" refers to a signal whose one or more characteristics are altered or set by encoding information in the signal. The modulation can be performed by analog, digital or hybrid modulation technologies. The communication media (particularly carrier waves, and other transmission signals that can contain data that can be of computer systems) are not included as a computer-readable storage medium.

As an example rather than a limitation, the computer-readable storage medium may include volatile media, non-volatile media, movable media and immovable media implemented by any method or technology for storing information such as computer-readable instructions, data structures, program modules or other data. For example, the computer-readable storage media include but are not limited to the volatile memory such as the random access memory (RAM, DRAM, SRAM); the nonvolatile memory such as the flash memory, various read-only memories (ROM, PROM, EPROM, EEPROM), the magnetic random access memory (MRAM), the ferromagnetic/ferroelectric random access memory (FeRAM); the magnetic and optical storage devices (hard disk, tape, CD, DVD); or other currently known media or the media which may be developed in the future to store the computer-readable information/data used by the computer system.

Herein, a device in an embodiment of the present disclosure includes a memory for storing computer program instructions and a processor for executing the computer program instructions, wherein, when the computer program instructions are executed by the processor, the device is driven to perform the aforementioned methods and/or technical solutions which are based on a plurality of the embodiments of the present disclosure.

For those skilled in the art, the present disclosure is not limited to the details of the above exemplary embodiments and can be implemented in other specific forms without deviating from the spirit or essential characteristics of the present disclosure. Therefore, in any case, the embodiments should be considered exemplary and nonrestrictive. The scope of the present disclosure is defined by the claim rather than the above description, so that all variations falling within the meaning and scope of the equivalents of the claims are included in the present disclosure, and any reference signs in the claims shall not be construed as limiting the claims. In addition, it is to be understood that the word "include/comprise" does not exclude other elements or steps. Singular does not exclude plural. A plurality of units or devices recited in the device claims may also be implemented by a unit or device by software or hardware. Words such as "first" and "second" are used to denote names, but not any particular order.

The invention claimed is:

1. A method for connecting to a wireless access point by an application in user equipment, comprising:
   acquiring identification information and access information of a target wireless access point according to a triggering operation by a user in the application and from target image information corresponding to the triggering operation by the user in the application; and
   establishing a wireless connection between the user equipment having the application and the target wireless access point according to the identification information and the access information;
   wherein, the step of acquiring the identification information and the access information of the target wireless access point according to the triggering operation by the user in the application and from the target image information corresponding to the triggering operation by the user in the application comprises:
   acquiring the target image information corresponding to the triggering operation according to the triggering operation by the user in the application; and
   extracting the identification information and the access information of the target wireless access point from the target image information.

2. The method according to claim 1, wherein, the target image information comprises:
   an image information captured in real time by a camera device of the user equipment; and
   an image information shared by other user equipment.

3. The method according to claim 1, wherein, the step of extracting the identification information and the access information of the target wireless access point from the target image information comprises:
   identifying one or more character strings from the target image information;
   extracting the identification information of the target wireless access point from the character strings when the character strings include a keyword of the identification information of the target wireless access point; and
   extracting the access information of the target wireless access point from the character strings when the character strings comprise a keyword of password information of the wireless access point.

4. The method according to claim 1, wherein, the step of extracting the identification information and the access information of the target wireless access point from the target image information comprises:
   identifying a plurality of character strings from the target image information, wherein at least one space character exists between any two character strings;
   using a first character string as the identification information of the target wireless access point when the first character string in the plurality of character strings is matched with a wireless access point scanned by the user equipment;
   determining one or more pieces of access information of the target wireless access point, wherein each piece of access information corresponds to one of the plurality of character strings other than the first character string;
   wherein, the step of establishing the wireless connection between the user equipment having the application and the target wireless access point according to the identification information and the access information comprises:
   according to the identification information and at least one of one or more pieces of access information, trying to establish the wireless connection between the user equipment having the application and the target wireless access point until the wireless connection succeeds or traversing the one or more pieces of access information.

5. The method according to claim 4, wherein, the first character string and the rest of the plurality of character strings are located on a line or adjacent lines.

6. The method according to claim 1, wherein, the step of acquiring the identification information and the access information of the target wireless access point from the target image information corresponding to the triggering operation by the user in an application comprises:
   according to the triggering operation by the user in the application, driving a camera device of the user equipment to continuously perform a scanning operation until the identification information and the access information of the target wireless access point are obtained from the target image information obtained by the scanning operation.

7. The method according to claim 1, further comprising:
   detecting whether a wireless access point list scanned by the user equipment includes the target wireless access point according to the identification information;
   wherein, the step of establishing the wireless connection between the user equipment having the application and the target wireless access point according to the identification information and the access information is performed when the wireless access point list comprises the target wireless access point.

8. The method according to claim 7, further comprising:
when the triggering operation is performed, the user equipment is triggered to scan the wireless access point list at a current location.

9. The method according to claim 1, further comprising:
when the wireless connection is successfully established, sharing the target wireless access point and the access information with corresponding network equipment, wherein, the target wireless access point is marked in the corresponding network equipment by the identification information and an address information of the target wireless access point.

10. A method for connecting to a wireless access point, comprising:
driving a camera device of user equipment to acquire access information of a target wireless access point according to a connection operation of a user to connect to the target wireless access point; and
establishing a wireless connection between the user equipment and the target wireless access point according to the access informations;
wherein, the step of driving the camera device of the user equipment to acquire the access information of the target wireless access point according to the connection operation of the user to connect to the target wireless access point comprises:
presenting an access information input window of the target wireless access point according to the connection operation of the user to connect to the target wireless access point, wherein, the access information input window comprises an image capturing button;
driving the camera device of the user equipment to acquire the access information of the target wireless access point according to a triggering operation by the user on the image capturing button.

11. A method for connecting to a wireless access point, comprising:
driving a camera device of user equipment to acquire identification information and access information of a target wireless access point according to a connection operation of a user to connect to the wireless access point; and
establishing a wireless connection between the user equipment and the target wireless access point according to the identification information and the access informations;
wherein, the step of driving the camera device of the user equipment to acquire the identification information and the access information of the target wireless access point according to the connection operation of the user to connect to the wireless access point comprises:
presenting an information input window of the target wireless access point to be connected according to the connection operation of the user to connect to the wireless access point, wherein, the information input window comprises an image capturing button; and
driving the camera device of the user equipment to acquire the identification information and the access information of the target wireless access point according to a triggering operation by the user on the image capturing button.

\* \* \* \* \*